3,538,163
PREPARATION OF PRIMARY AMINES BY HYDROGENATION OF MONOCARBOXYLIC ACIDS IN THE PRESENCE OF AMMONIA
Horst Rutzen, Dusseldorf-Holthausen, and Hartwig Schutt, Dusseldorf-Benrath, Germany, assignors to Henkel & Cie GmbH, Dusseldorf-Holthausen, Germany, a corporation of Germany
No Drawing. Filed Oct. 31, 1967, Ser. No. 679,520
Claims priority, application Germany, Dec. 7, 1966, H 61,208
Int. Cl. C07c 85/00, 85/02, 85/17
U.S. Cl. 260—583    5 Claims

ABSTRACT OF THE DISCLOSURE

A continuous process for the preparation of primary amines by hydrogenation of monocarboxylic acids in the presence of ammonia.

PRIOR ART

While several methods for the preparation of amines on a laboratory scale are known, the industrial preparation of amines is predominantly limited to the catalytical hydrogenation of nitriles under perssure. For primary amines, this hydrogenation is effected in the presence of a cobalt or nickel metal catalyst and a large quantity of ammonia. In order to prepare the nitriles to be hydrogenated, fatty acids are reacted in the liquid or gas phase with amomnia in the presence of a catalyst which results in dark-colored products, which have to be distilled in vacuo before hydrogenation which results in reduced yields. A direct preparation of primary amines from carboxylic acids has not been known until now.

OBJECTS OF THE INVENTION

It is an object of the invention to provide a novel process for the preparation of primary amines directly from carboxylic acids.

It is a further object of the invention to provide an economical commercial process for the direct preparation of primary amines without intermediate recovery of nitriles.

These and other objects and adavntages of the invention will become obvious from the following detailed description.

THE INVENTION

The process of the invention for the preparation of primary amines comprises hydrogenating a monocarboxylic acid in the gaseous phase with excess hydrogen containing 2 to 15% by volume of ammonia at a temperature of 200° to 400° C. and a gas pressure of 60 to 400 atmospheres in the presence of a pelletized metal catalyst in the oxidic form under the reaction conditions. Preferably the reaction is effected at 250°–330° C. and a pressure of 100 to 300 atmospheres with hydrogen containing 3 to 8% by volume of ammonia.

The starting monocarboxylic acid may be an aliphatic, cycloaliphatic or aromatic carboxylic acid and may contain substituents which are unaffected by the reaction conditions such as ether group, amino groups, hydrocarbons, etc. Examples of suitable carboxylic acids are aliphatic monocarboxylic acid having 4 to 24 carbon atoms in the molecule such as butyric acid, valeric acid, capric acid, caproic acid, palmitic acid, stearic acid, oleic acid, linoleic acid, behenic acid, etc.; cycloaliphatic carboxylic acids such as cyclopentane carboxylic acid, cyclohexane carboxylic acid, their substitution products and/or mixtures such as naphthenic acids, etc.; aromatic carboxylic acids, such as benzoic acid, phenylacetic acid, diphenylmethane carboxylic acid, etc.

In some instances, particularly with high-melting carboxylic acids, the carboxylic acid is advantageously added to the reaction apparatus in solution in an inert solvent. Examples of suitable inert organic solvents are aliphatic and cycloaliphatic hydrocarbons and ethers such as hexane, cyclohexane, methylcyclohexane, ethyl ether, etc.

Examples of suitable metal catalysts which are oxidic under the reaction conditions are preferably zinc-chrominum and zinc-aluminum oxidic catalysts.

Zinc-chromium oxidic catalysts for the invention may be prepared by admixing powdery zinc oxide with aqueous chromic acid, preferably large amounts in a kneading machine, whereby chromic acid combines with zinc oxide to form zinc chromate due to the heat of reaction. The zinc chromate can be converted into zinc chromite by slow reduction. The slow reduction is effected at 280–350° C. at a hydrogen pressure of 30 to 50 atmospheres in which the hydrogen pressure is gradually increased to avoid a significant temperature increase.

The zinc-chromium catalyst can also be prepared by reducing chromic acid to chromium III oxide hydrate such as with methanol and admixing the said hydrate in aqueous suspension with zinc oxide or zinc hydroxide or by admixing zinc oxide and chromium III hydroxide freshly precipitated from chromium III salts.

The zinc-aluminum oxidic catalysts for the invention may be prepared by admixing powdery zinc oxide with an aqueous aluminum hydroxide suspension, preferably freshly precipitated aluminum hydroxide. The aluminum hydroxide may be an amorphous or crystalline and $\gamma$-aluminum oxide may be used in place of the aluminum hydroxide.

Since the catalysts are preferably in pellet form for the hydrogenation, the aqueous paste mixture of catalyst is dried and broken into lumps or dried, ground into a powder, admixed with a binding agent and/or graphite and compressed into easily handled tablets.

The hydrogen is used in an excess of that theoretically required and is preferably 50 to 200 times the theoretical amount. The excess hydrogen not only has a desirable effect on the reaction equilibrium but also ensures that the reaction is effected in the gaseous phase. For the latter purpose, a portion of the hydrogen can be replaced with any gas inert under the reaction conditions such as nitrogen. Preferably, the reaction is effected with technically pure hydrogen.

The volume of ammonia in the hydrogen gas is 2 to 15%, preferably 3 to 8%. Since ammonia is steadily consumed during the reaction and losses also occur by dissolution in the reaction product and during depressurizing of the apparatus, the volume of ammonia in the re-cycle gas is maintained by continuous addition of fresh or reclaimed ammonia. This addition takes place simultaneously with that of the carboxylic acid in a quantitative relation of about 100–1,000 gm. of liquid ammonia per liter of carboxylic acid. The two reactants are heated prior to their introduction into the recycle gas, preferably to about 50°–250° C.

The so-called "amine number" has been used in the examples as an index of the amount of amine formed. The amine number is the amount of potassium hydroxide in mg. required to neutralize consumed amount of hydrochloric acid with formation of 1 gm. amine hydrochloride.

The process of the invention has the advantages that relatively inexpensive carboxylic acids can be used as the starting materials and that they can be directly converted in good yields to the desired primary amine without the costly isolation of the intermediate nitrile. The process provides an inexpensive commercial scale process for amine preparation. This result is all the more startling since it could not have been anticipated that with the process of the invention, all of the intermediate reactions required for the development of a primary amine, namely the formation of ammonium salt and the proceeding through the acid amide to the nitrile, would proceed smoothly and practically quantitatively. Furthermore, there existed the danger that the water of reaction resulting from the formation of amide and nitrile would interfere with the hydrogenation itself.

In the following examples there are described several preferred embodiments to illustrate the invention. However, it should be understood that the invention is not intended to be limited to the specific embodiments.

EXAMPLE I

Crystalline aluminum oxide having a bulk weight of 1275 g./liter and powdery technical zinc oxide in a 1:1 ratio were stirred into water. The solution was vacuum filtered and the solid mixture was dried, admixed with 3% by weight of graphite and compressed into 4 mm. tablets.

4 liters of the resulting tablets were introduced into a 4 liter hydrogenation pressure vessel equipped with a gas recycle system, water cooling and a pressure separator for separating hydrogen and depressurized reaction product. Hydrogen at a pressure of 250 atmospheres was introduced therein and the apparatus was heated to 280° C. with a recycle of 240 pressure liters per hour. After raising the reaction temperature of 300° C., a mixture of 0.5 liter of technical grade coconut oil acids having an acid number of 257.5 and 200 gm. of liquid ammonia, preheated to 150° C., was fed per hour into the apparatus. The acid had the following carbon chain composition as determined by gas chromatography: 1.0% $C_8$, 2.5% $C_{10}$, 51.0% $C_{12}$, 24.5% $C_{14}$, 10.0% $C_{16}$ and 11.0% $C_{18}$. The ammonia content of the recycling gas was 4.5% by volume. 0.5 liter per hour of a water clear reaction product was distilled off through the pressure separator which product had an amine number of 236 after removal of dissolved ammonia. The amine mixture was separated by distillation over a 1 meter column packed with saddles and the following primary amine composition was obtained.

| Primary amine: | Percent |
|---|---|
| $C_{10}$ | 1.5 |
| $C_{12}$ | 42.0 |
| $C_{14}$ | 19.0 |
| $C_{16}$ | 8.5 |
| $C_{18}$ | 8.0 |
| Residue | 21.0 |

EXAMPLE II 1 kilo mole of powdery technical zinc oxide and 0.6 kilo mole of chromium IV oxide were admixed in a kneading machine with sufficient water to obtain a firm paste. The said paste was dried at 80° C. and the resulting cake was finely ground, admixed with 3% by weight of graphite and compressed into 6 mm. tablets.

12 liters of the said tablets were introduced into a 14 liter hydrogenation apparatus similar to that of Example I. The apparatus was heated to 280° C. while recycling nitrogen therethrough under a pressure of 50 atmospheres. Small amounts of hydrogen were added to the recycling nitrogen whereby the zinc chromate portion of the catalyst was reduced to zinc chromite so slowly that there was no significant temperature increase. Then the recycle gas was replaced by hydrogen containing 6% by volume of ammonia and the said gas was recycled at a rate of 385 pressure liters per hour. The apparatus was heated to 300° C. and each hour 1 liter of technical coconut oil acids having an acid number of 268 and 600 gm. of liquid ammonia were added to the apparatus. The said acid had the following carbon chain composition as determined by gas chromatography: 0.6% $C_6$, 9.3% $C_8$, 7.3% $C_{10}$, 46.9% $C_{12}$, 17.9% $C_{14}$, 8.6% $C_{16}$, and 9.4% $C_{18}$. 1 liter of a water clear reaction product was removed from the apparatus each hour which product had an amine number of 279 after removal of dissolved ammonia. The distilled product had the following composition.

| Primary amine: | Percent |
|---|---|
| $C_8$ | 5.5 |
| $C_{10}$ | 6.0 |
| $C_{12}$ | 47.0 |
| $C_{14}$ | 17.0 |
| $C_{16}$ | 8.0 |
| $C_{18}$ | 6.5 |
| Residue | 10.0 |

EXAMPLE III

The hydrogenation apparatus and catalyst were prepared as in Example II except that the nitrogen was replaced by hydrogen containing 4.5% by volume of ammonia. The apparatus was then heated to 310° C. and each hour, 1 liter of a coconut acid having an acid number of 257.5 dissolved in 2 liters of methyl cyclohexane and 300 gm. of liquid ammonia were added to the apparatus. The said acid had the following carbon chain composition as determined by gas chromatography: 3.5% $C_{10}$, 51.0% $C_{12}$, 24.5% $C_{14}$, 10.0% $C_{16}$ and 11.0% $C_{18}$. The reaction product had an amine number of 238 and after removal of the solvent, the distilled product had the following composition.

| Primary amine: | Percent |
|---|---|
| $C_{10}$ | 2.5 |
| $C_{12}$ | 43.5 |
| $C_{14}$ | 20.5 |
| $C_{16}$ | 10.0 |
| $C_{18}$ | 9.5 |
| Residue | 14.0 |

EXAMPLE IV

The hydrogenation apparatus and catalyst were prepared in Example II evcept that the nitrogen was replaced with 385 liters of a mixture of 147 atmospheres of hydrogen, 100 atmospheres of nitrogen and 13 atmospheres of ammonia which was recycled through the apparatus at 250 pressure atmospheres per hour at a temperature of 310° C. Each hour, 1 liter of commercial stearic acid having an acid number of 205 and 600 gm. of liquid ammonia, both preheated to 200° C. were added to the apparatus. The stearic acid had the following carbon chain composition as determined by gas chromatography: 0.5% $C_8$, 0.4% $C_{10}$, 1.9% $C_{12}$, 3.4% $C_{14}$, 0.8% $C_{15}$, 28.2% $C_{16}$, 2.0% $C_{17}$, 62.1% $C_{18}$ and 0.7% $C_{20}$. The ammonia was 5% by volume of the recycle gas. About 1 liter per hour of a water clear reaction product was recovered through the pressure separator and it had an amine number of 205. Distillation of the product through an 80 cm. column packed with saddles has the following composition:

| Primary amine: | Percent |
|---|---|
| $C_8$ | 0.5 |
| $C_{10}$ | 1.0 |
| $C_{12}$ | 2.0 |
| $C_{14}$ | 3.5 |
| $C_{15}$ | 1.0 |
| $C_{16}$ | 23.0 |
| $C_{17}$ | 2.0 |
| $C_{18}$ | 55.0 |
| Residue | 12.0 |

EXAMPLE V

Using the same apparatus and conditions of Example II, each hour 1 liter of caprylic acid having an acid number of 388 and 500 gm. of liquid ammonia were added to the apparatus and the hydrogen gas containing 6% by volume of ammonia was recycled at a rate of 385 liters per hour at 240 atmospheres and the reaction temperature was 310° C. 1 liter per hour of a water clear reaction product having an amine number of 383 was recovered. Distillation of the product through an 80 cm. column packed with saddles resulted in 80% n-octylamine and 20% of residue in the form of higher alkylated amines.

Various modifications of the process may be made without departing from the spirit or scope thereof.

We claim:

1. A continuous process for the preparation of primary amines which comprises hydrogenating an aliphatic monocarboxylic acid of 4 to 24 carbon atoms in the gaseous phase with excess hydrogen containing 2 to 15% by volume of ammonia at a temperature of 200° to 400° C. and a gas pressure of 50 to 400 atmospheres in the presence of a pelletized metal catalyst in the oxidic form under the reaction conditions selected from the group consisting of zinc chromium oxidic catalyst and zinc aluminum oxidic catalyst.

2. The process of claim 1 wherein the reaction temperature is about 250 to 330° C. and the gas pressure is 100 to 300 atmospheres.

3. The process of claim 1 wherein the ammonia volume is maintained by the addition of 100 to 1000 gm. of liquid ammonia per liter of carboxylic acid per hour.

4. The process of claim 3 wherein the carboxylic acid and ammonia are pre-heated to 50 to 250° C. before introduction into the system.

5. The process of claim 1 wherein the hydrogen contains 3 to 8% by volume of ammonia.

References Cited

UNITED STATES PATENTS

| 2,166,971 | 7/1939 | Schmidt et al. | 360—585 X |
| 2,187,745 | 1/1940 | Lazier | 260—585 X |

CHARLES B. PARKER, Primary Examiner

R. L. RAYMOND, Assistant Examiner

U.S. Cl. X.R.

252—463, 468; 260—563, 570.9